United States Patent Office 2,813,703
Patented Nov. 19, 1957

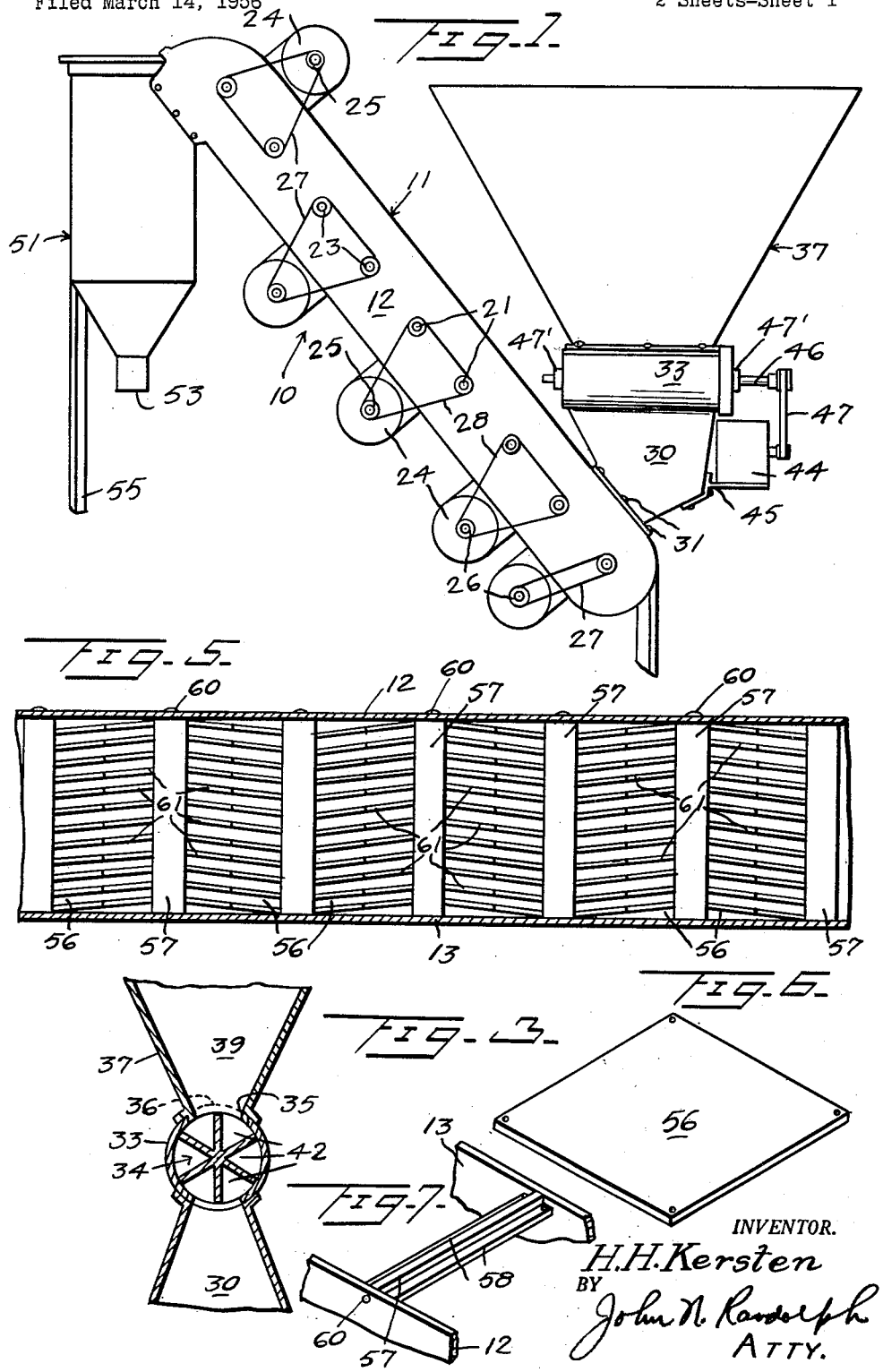

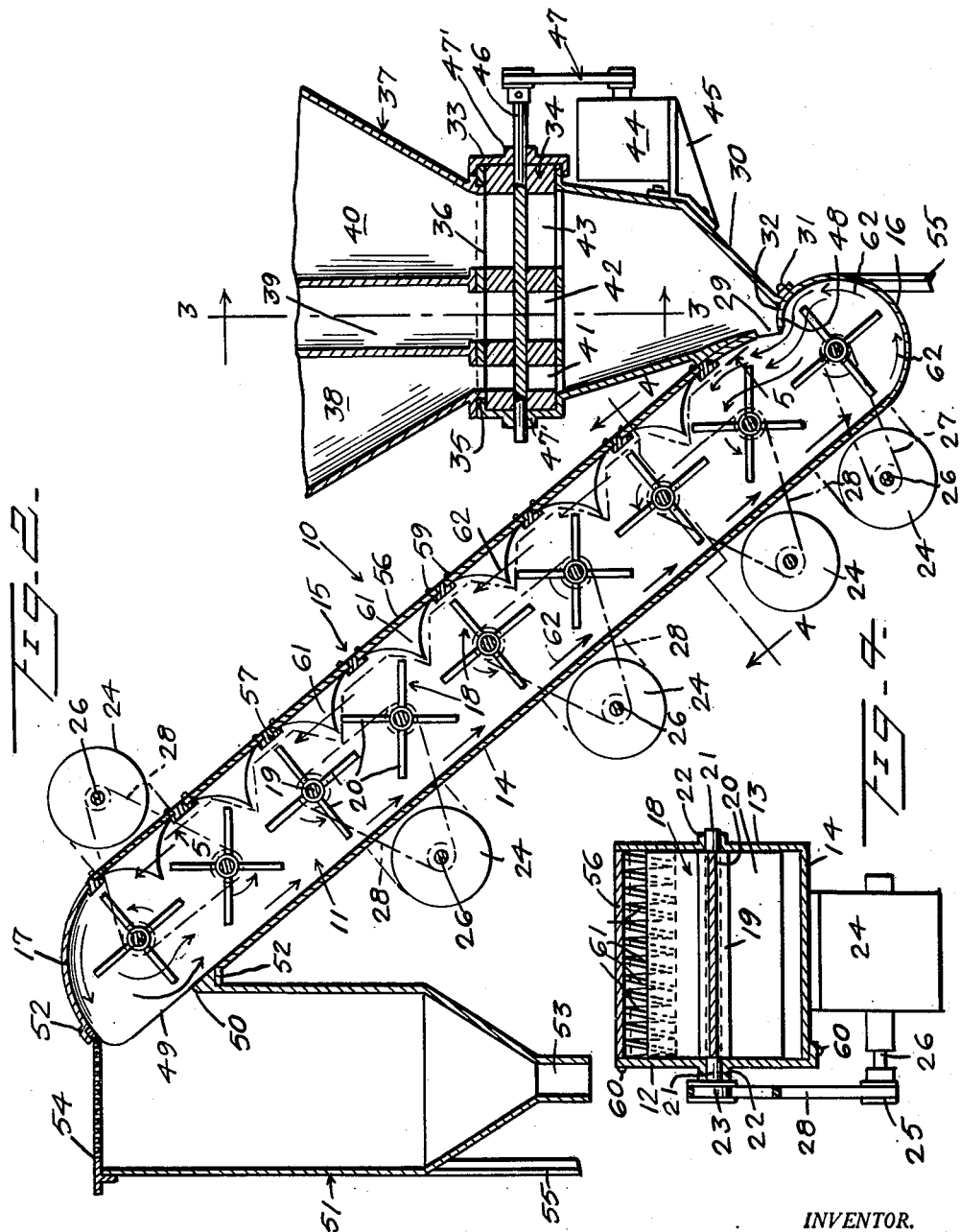

2,813,703

CENTRIFUGAL CONVEYOR AND MIXER

Herbert H. Kersten, Fort Dodge, Iowa

Application March 14, 1956, Serial No. 571,450

6 Claims. (Cl. 259—6)

This invention relates to an apparatus of extremely simple construction for elevating or conveying and simultaneously mixing a combination of materials in powdered or finely ground form, and which readily adapts itself for use in connection with plaster mixtures, various dry food mixes, such as cake mixes, soap powder mixes, and the like.

More particularly, it is an object of the invention to provide an apparatus wherein a number of ingredients may be supplied to the conveyor through a metering unit in selected proportions and will be thoroughly mixed during travel thereof through the conveyor, so that the mixture will be ready for packaging upon discharge from the conveyor, thus eliminating the necessity of batch mixing the materials.

Still a further object of the invention is to provide an apparatus which is likewise adapted for use solely as a conveyor or as an elevator, or a combination elevator and mixer.

Various other objects and advantages of the invention will hereinafter become more fully apparent from the following description of the drawings, illustrating a presently preferred embodiment thereof, and wherein:

Figure 1 is a side elevational view of the conveyor and mixer;

Figure 2 is an enlarged fragmentary longitudinal sectional view thereof, partly in elevation;

Figure 3 is a fragmentary transverse vertical sectional view, taken substantially along a plane as indicated by the line 3—3 of Figure 2;

Figure 4 is an enlarged cross sectional view through the conveyor, taken substantially along a plane as indicated by the line 4—4 of Figure 2;

Figure 5 is a longitudinal sectional view, taken substantially along a plane as indicated by the line 5—5 of Figure 2;

Figure 6 is an enlarged perspective view looking toward the upper side of one of the demountable top panels of the conveyor casing, and Figure 7 is a fragmentary perspective view looking toward a portion of the top of the conveyor casing and shown with the panels removed therefrom.

Referring more specifically to the drawings, the centrifugal conveyor and mixer in its entirety and comprising the invention is designated generally 10 and includes an elongated conveyor casing, designated generally 11, having side walls 12 and 13, a bottom wall 14, a top wall, designated generally 15, and ends 16 and 17 which are generally rounded.

A plurality of rotors or propellers 18 are mounted rotatably in the casing 11 with their axes disposed crosswise of said casing and in longitudinally spaced relation to one another. The rotors or propellers 18 are of radial paddle wheel construction each including a long cylindrical hub 19 from which a plurality of vanes or blades 20 project radially. The hubs and vanes are the same length and are sized to fit between the side walls 12 and 13, as seen in Figure 4. Shaft ends 21 extend axially from the ends of each hub 19 and are journalled in externally flanged openings of the side walls 12 and 13 which form bearings 22. Belt pulleys 23 are shown secured to the shaft ends 21 which extend outwardly from the wall 12. Any suitable form of drive may be provided for driving the rotors or propellers 18 simultaneously in the same direction, counterclockwise as seen in Figure 2. As illustrated, a plurality of small motors 24, preferably electric motors, has been provided, all but one of which motors are secured to the outer side of the bottom wall 14. A pulley 25 is fixed to an end of the drive shaft 26 of each motor 24 and said pulleys 25 are disposed in the same plane as the pulleys 23. The lowermost rotor 18 is shown driven by one motor 24 by means of a belt 27 which is trained around the pulley 23 of said rotor and the pulley 25 of the lowermost motor. Each of the other motors 24 drives a pair of rotors 18 by an endless belt 28 which is trained around the pulley 25 thereof and around the pulleys 23 of two adjacent rotors. The uppermost pair of rotors 18 is driven by the motor 24 which is mounted on the top wall 15.

The top wall 15 adjacent the casing end 16 is provided with an inlet opening 29, as seen in Figure 2. A hopper 30 is secured by suitable fastenings 31 to the top wall 15 with the outlet of said hopper, designated 32, in registration with the casing inlet 29. The hopper 30 is flared upwardly from its outlet 32 and has an open upper end shaped to form a valve casing 33 in which is journalled a rotary valve 34 in the form of an elongated drum. The valve casing 33 has an open upper end 35 on which is mounted the open bottom 36 of a storage bin 37 which is illustrated as being provided with three separate compartments 38, 39 and 40, which open separately through the bin bottom 36 into the valve casing 33. The valve 34 is provided with three series of radial pockets 41, 42 and 43 which open outwardly of the periphery thereof. The pockets of the different series are of different capacities. As illustrated, the pockets 41 which communicate with the open bottom of the compartment 38 are of one-half the capacity, for example, of the pockets 42, into which the bin compartment 39 discharges, and are of one-third the capacity of the pockets 43, into which the bin compartment 40 discharges. It will be understood that the proportions of the pockets of the different series of the valve 34 may vary depending upon the materials to be mixed. A small motor 44, such as an electric motor, is supported as by means of a bracket 45 which is fastened to a portion of the exterior of the hopper 30. The drive shaft of the motor 44 is connected to a shaft 46 of the rotary valve 34 in any suitable manner, as by means of a belt and pulley drive connection 47. The shaft 46 extends axially through and is fixed to the valve 34. Said shaft is journalled in bearings 47' of the end walls of the valve casing 33. As seen in Figure 2, one of said casing end walls may be removable.

The edge of the portion of the top wall 15 of the conveyor casing 11 which defines one transverse edge of the inlet opening 29 and which is located nearest the casing end 16 is bent to provide a lip 48 which is flared inwardly with respect to the casing 11 to provide a restriction therein.

The casing bottom 14 is provided with a relatively large opening 49 at the end thereof which merges with the rounded end 17 and which registers with an opening 50 in the upper part of a side wall of a hopper 51. The hopper 51 is suitably connected, as seen at 52 to the casing 11. The hopper 51 has a restricted outlet 53 at the lower end thereof and is otherwise closed except for its opening 50 and a foraminous or perforated top wall 54 thereof.

The parts previously described may be supported by a suitable frame or supporting structure, portions of which are shown at 55 connected to the conveyor casing 11 and hopper 51.

Between the point where the hopper 30 is connected to the top wall 15 and the casing end 17, the top wall 15 is composed of a plurality of detachably mounted panels 56 and cross braces 57 on which the panels 56 are supported. The cross braces 57 are of inverted T-shape in cross section, as seen in Figure 2, and are secured to the side walls 12 and 13. Each panel 56 is supported on the adjacent flanges 58 of two adjacent cross braces 57, as seen in Figure 2, and is detachably secured thereto by fastenings 59. The side wall 12 is preferably made removable for applying and removing the rotors 18 and is secured by fastenings 60 to the bottom 14 and to complementary ends of the cross members 57, as seen in Figure 4.

Each panel 56 has a series of depending vanes or deflector elements 61 secured to the underside thereof and which are disposed in parallel relation to one another. The deflector elements 61 are disposed at an angle to the longitudinal axis of the casing 11 and the deflector elements of adjacent panels 56 are inclined in opposite directions, as clearly illustrated in Figure 5, so that air passing longitudinally of the casing 11 between the deflectors of the different panels will be caused to follow a zigzag path.

The motors 24 and 44 are driven simultaneously. The motor 44 is operated at a desired speed to supply a desired quantity continuously to the hopper 30 of the materials, not shown to be mixed, from the three bin compartments 38, 39 and 40, in desired proportions as previously mentioned. Such materials will be powdered or finely ground form and will be discharged by gravity from the valve pockets into the hopper 30 and toward the discharge end 31 thereof and the inlet end 29 of the casing 11.

The motors 24 operate at a high speed to produce a sufficiently rapid rotation of the rotors 18 so that the vanes or paddles 20 thereof will set up a strong "belt-like" motion of air within the casing 11, as illustrated by the arrows 62 in Figure 2, and which is in a counterclockwise direction, corresponding to the direction of rotation of the individual rotors 18. The lip 48 creates a constriction in the air column which produces a slight negative pressure within the casing directly beyond the lip 48 and in close proximity to the inlet 29 so that materials to be conveyed and mixed are drawn through the inlet 29 from the hopper 30 into the upwardly flowing column of air, located adjacent the casing top wall 15 and traveling toward the casing end 17. The rotational velocity of the rotors 18 is sufficient so that the materials will be urged by centrifugal force toward the superior surface 15 of the casing and also in a direction toward the casing end 17. The contained particles of material thus borne in the upwardly traveling flow stream will be caused to travel between the vanes or baffles 61 of each panel 56 and which, as previously described, will cause the air column and the materials borne thereby to follow a zigzag path from the inlet 29 toward the casing end 17, creating a turbulence which will produce a very effective mixing of the several materials.

As the materials in the air stream reach the casing end 17, the materials will be deflected by the casing end 17 and by the centrifugal force of the paddles 20 of the uppermost rotor 18 toward the casing outlet 49 through which the thoroughly mixed materials will be discharged into the outlet hopper 51. The thoroughly mixed materials will be discharged by gravity through the outlet 53 of the hopper into any suitable containers, not shown, disposed therebeneath and in which the materials can be immediately packaged. The air column will reverse its direction of travel in passing around the uppermost rotor 18 and as indicated by the arrows 62 will then flow in the opposite direction along the bottom 14 of the casing toward the casing end 16. Any of the mixed materials which are not discharged through the outlet 49 or which pass from top to bottom of the casing between the rotors 18 will be borne and recycled by the downwardly traveling air column.

It will be noted that the axis of the valve 34 is disposed parallel to the longitudinal axis of the conveyor casing 11 so that the materials from the three bin compartments will be distributed across the casing at the inlet 29 to obtain maximum uniformity in the mixing.

It will be readily apparent that any air escaping from the casing into the hopper 51 may escape therefrom through its foraminous top 54.

While conveyor casing 11 has been shown disposed at an incline so as to constitute an elevator, it will be readily apparent that said casing could be disposed horizontal to provide merely a conveyor and mixer or could be inclined downwardly toward its outlet end. Where a mixture of materials is not required or where a less thorough mixing is unnecessary, the baffles 61 may be omitted.

Various other modifications and changes are contemplated and may obviously be resorted to, without departing from the function or scope of the invention as hereinafter defined by the appended claims.

I claim as my invention:

1. A conveyor of the character described comprising an elongated casing having spaced substantially parallel top and bottom walls, said top wall having an inlet adjacent one end thereof, said bottom wall having an outlet adjacent the opposite end of said casing, said casing being closed except for the inlet and outlet thereof, a plurality of rotors rotatably mounted in said casing and disposed in close proximity to the top and bottom walls, said rotors being disposed in close proximity to one another and with their axes of rotation crosswise of the casing, said casing having rounded ends disposed partially around and in close proximity to said certain of the rotors located adjacent the ends of the casing, means for driving said rotors at a high speed and in the same direction for producing in combination with the top and bottom walls and rounded ends an endless belt-like air stream or column within the casing into which material to be conveyed is adapted to be received from the casing inlet for conveyance longitudinally of the casing and from which the material is discharged by centrifugal force from the casing outlet, said casing inlet being disposed relative to the casing ends so that the material will be received into and conveyed by the upper portion of the air stream, traveling between the rotors and top wall, substantially from end-to-end of the casing, said outlet being formed in an underside of the casing, at the end thereof toward which the material is conveyed and in close proximity to one of said rotors whereby the material is discharged by centrifugal force through said outlet and as the direction of travel of the air column is reversed by the casing, a sacking hopper connected to the casing and communicating with the outlet thereof for receiving the material discharged from the casing, said sacking hopper having a foraminous top wall portion opening to the atmosphere for the escape of excess air from the casing and hopper.

2. A conveyor of the character described comprising an elongated casing having spaced substantially parallel top and bottom walls and rounded ends, said top wall having an inlet adjacent one end thereof, said bottom wall having an outlet adjacent the opposite end of the casing, said casing being closed except for the inlet and outlet, a plurality of centrifugal force imparting means contained within said casing and disposed in close proximity to the top and bottom walls, and means for driving said centrifugal force imparting means simultaneously and in the same direction for creating an endless air stream within the casing in the form of an endless belt-like column adapted to receive materials to be conveyed from said inlet while passing in close proximity thereto for conveying the materials substantially from end-to-end of the casing along the underside of the top wall and from which the materials are discharged by centrifugal force through said casing outlet and as the direction of travel of the belt-like column of air is reversed by one of the casing ends and a portion of said centrifugal force imparting means 3. A conveyor as in claim 2, and baffle means supported within said casing and longitudinally thereof by the top wall for causing the endless air stream and the material borne thereby traveling along said top wall to follow a zigzag course to produce turbulence in the air stream for mixing material borne therein.

4. A conveyor as in claim 2 and a metering supply unit connected to and discharging into the casing inlet including means for supplying a plurality of materials in predetermined proportions simultaneously to the casing inlet, the axis of the casing and a metering part of the metering supply unit being disposed in planes substantially parallel to one another to cause the several materials to be distributed uniformly across the casing inlet.

5. A conveyor as in claim 2, said casing having an internal restriction adjacent the inlet thereof to produce a constriction in the air stream to create a negative pressure in the casing at said inlet for drawing the materials into the air stream.

6. A conveyor as in claim 2, said casing being disposed at an incline and having the inlet located adjacent the lower end thereof to provide an elevator.

References Cited in the file of this patent

UNITED STATES PATENTS

| | | |
|---|---|---|
| 803,945 | Weinrich | Nov. 7, 1905 |
| 2,081,851 | Darby et al. | May 25, 1937 |
| 2,279,287 | Chesnut | Apr. 7, 1942 |
| 2,608,394 | Williamson | Aug. 26, 1952 |